J. BURKE.
Seeding Machines.
No. 155,704. Patented Oct. 6, 1874.
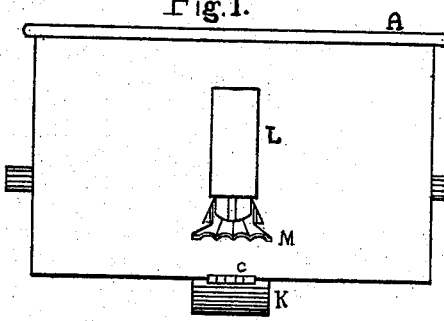
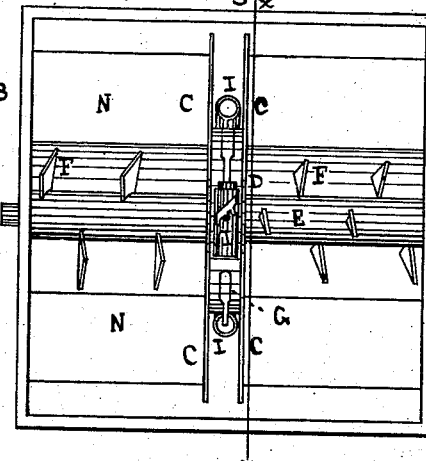
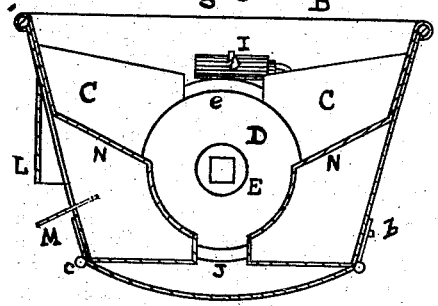
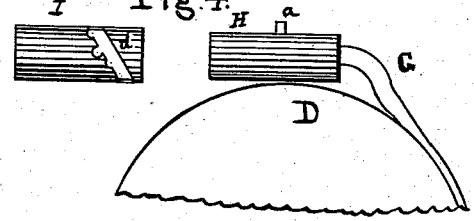
Witnesses:
A.W. Bond
Wm. R. Plum
Inventor:
John Burke
By West & Bond
His Atty's

UNITED STATES PATENT OFFICE.

JOHN BURKE, OF SYCAMORE, ILLINOIS.

IMPROVEMENT IN SEEDING-MACHINES.

Specification forming part of Letters Patent No. 155,704, dated October 6, 1874; application filed April 5, 1873.

*To all whom it may concern:*

Be it known that I, JOHN BURKE, of Sycamore, in the county of DeKalb and State of Illinois, have invented certain new and useful Improvements in Seeding-Machines, of which the following is a full description, reference being had to the accompanying drawings, making a part of this specification, in which—

Figure 1 is a side elevation, Fig. 2 a top or plan view, Fig. 3 a vertical cross-section on line $x$ $x$ of Fig. 2, and Fig. 4 a detail, of the seed-cup.

The object of my invention is to furnish a seeding device which shall be uniform in its operation without regard to the height or quantity of the grain in the box or boxes, and so adjusted that it can be adapted to different kinds of grain or seeds, and easily cleaned in changing from one kind to another.

In the drawings, A represents the sides of the grain-box; B, the ends or partitions when the box is divided into sections; C, projections or wings; D, feed-wheel; E, revolving shaft; F, curved or angular wings for advancing the grain to the feed-wheel; G H I, seed-cup; J, opening through false and main bottom into hinged trough or receptacle; K, trough; L M, discharge-pipe; N, false bottom; O, gear-wheel for connecting the devices with the motive power; $a$, pin on the bolt forming the interior of the seed-cup; $b$, catch for hinged receptacle K; $c$, hinge; $d$, inclined slot in the cylinder or shell I of the seed-cup; $e$, shoulder on the wheel D. The box A B may be made in length equal to the width of the machine; or may be made in sections, using the ends B for partitions. This box is provided with a false bottom, the outer sides of which are inclined toward the center, and provided, in the middle, with a curved section, adapted to fit the wings F, as shown at Fig. 3. The shaft E may be made of wood, or of iron, or with an iron center and wooden exterior. A suitable number of wings, F, are attached to this shaft, and inclined right and left, as shown at Fig. 2, so as to bring the grain from both sides to the wheel D. The wheel D, revolving with the shaft, carries the grain through the opening J into the receptacle K, and prevents the clogging of the grain at the opening. This method of forcing the grain into the receptacle K keeps it full, and makes the feed uniform, whether there be much or little grain in the box A B. By hinging the receptacle K, it is easily opened, so that any grain not taken up by the seed-cups can be removed without opening the seed-box, and a few turns of the shaft E will carry the grain into this receptacle or receptacles K, so that the machine can be easily changed from one grain or seed to another, and also easily cleaned when grain is left in the box after completing the seeding. The seeding-cups are made of a solid rod or core, H, which is attached to the wheel D by a bar, G, or other suitable means. The part H is provided with a pin, $a$, which fits into the inclined slot $d$ of the shell I, which slot is provided with notches for holding it in any desired position, and by means of which the cups can be quickly changed in their capacity; and the slot $d$ has sufficient range to change from grain to small seed. Any suitable number of these seed-cups are placed upon the wheel D, the number being proportioned to the size of the wheel and speed of the shaft. When the shaft E runs the whole length of the box without partitions, it will be advisable to support it by suitable bridges at or near the wheel D. The lower part of the delivery-spout is provided with radial corrugations, so as to scatter the grain, and extends inward sufficiently far to catch the grain as it falls from the seed-cups.

In operation, the grain or seed is placed in the box A B, and carried against the wheel D by means of the angular wings F, and, by their joint action, is driven through the hole J into the receptacle K, where it is caught up and carried around, and delivered by the seed-cup. It will be obvious that this arrangement will furnish a uniform feed whether there be much or little grain in the box. In fitting the wings or projections C to the wheel D, I prefer to bring their curved edges against the shoulder $e$ of the said wheel D, as shown in Fig. 3. When the shaft E is made of wood, a screw-thread of suitable form may be cut thereon to take the place of the wings F; and, if desired, the bottom of the seed-box can be so cut away as to leave the false bottom N the true bottom.

What I claim as new is as follows:

The combination of the conveyer E with the wheel D, openings J, and hinged receptacle K, substantially as and for the purpose specified.

JOHN BURKE.

Witnesses:
JOHN SYME,
J. L. PRATT.